United States Patent [19]

Whillans

[11] 4,382,982

[45] May 10, 1983

[54] PROCESS FOR PROTECTING MAGNETIC PARTICLES WITH CHROMIUM OXIDE

[75] Inventor: Francis D. Whillans, Melbourne, Australia

[73] Assignees: ICI Australia Limited, Victoria; Commonwealth Scientific and Industrial Research Organization, Campbell, both of Australia

[21] Appl. No.: 212,336

[22] Filed: Dec. 2, 1980

[30] Foreign Application Priority Data

Dec. 7, 1979 [AU] Australia .............................. PD1644

[51] Int. Cl.³ .......................... B05D 5/12; B05D 7/00
[52] U.S. Cl. .................................... 427/130; 210/509; 210/695; 210/924; 427/131; 427/214; 427/216; 427/217; 427/243; 427/247; 427/352
[58] Field of Search .............. 427/127, 130, 212, 215, 427/216, 217, 243, 244, 247, 352, 373, 131, 214; 252/62.51, 62.54, 62.56; 210/509, 924, 622, 623, 695; 521/27

[56] References Cited

U.S. PATENT DOCUMENTS 3,778,373 12/1973 Robbins ............................ 252/62.56
3,932,293  1/1976 Roden .............................. 427/127 X
4,064,292 12/1977 Schoenafinger et al. ....... 427/127 X
4,211,664  7/1980 Dixon et al. ..................... 252/62.54
4,255,492  3/1981 Audran et al. ............... 252/62.56 X Primary Examiner—Norman Morgenstern
Assistant Examiner—Thurman K. Page
Attorney, Agent, or Firm—Cushman, Darby & Cushman

[57] ABSTRACT

A method for the preparation of magnetic particulate matter coated with a protective layer of chromium(III) hydroxide, oxyhydroxide or oxide, optionally cross-linked with polyacrylic acid, which process comprises a first step of depositing a hydrogel of chromium(III) hydroxide onto magnetic material in a desired particulate form, a second step of heating to form chromium(III) hydroxide, oxyhydroxide or oxide, and a third optional step, which may precede or follow the said second step, of crosslinking with polyacrylic acid. The coated protected magnetic particles are useful for the preparation of composite magnetic polymeric particles for use in processes involving ion exchange, filtration and adsorption.

19 Claims, No Drawings

PROCESS FOR PROTECTING MAGNETIC PARTICLES WITH CHROMIUM OXIDE

This invention relates to composite particles comprising a finely-divided, magnetic, particulate material embedded in a matrix of a polymeric material and more particularly to processes for treating the magnetic particulate material prior to incorporation into the composite particles.

Composite particles consisting of a finely-divided magnetic material embedded in a polymer matrix are prepared for a variety of uses, the nature of the polymer and the desired size and shape of the composite particles depending on the intended use. Some examples are ion-exchange resins containing magnetic iron oxide or other ferrites as described in U.S. Pat. Nos. 3,560,378 and 3,607,740. Composites comprising magnetic material embedded in hydrophobic polymers have found application as re-useable filter aids (U.S. Pat. No. 3,951,799), in oil-slick removal (U.S. Pat. No. 3,890,224), and in liquid-liquid extraction (U.S. Pat. No. 3,923,651). Magnetic material incorporated into composite adsorbents containing such adsorbents as activated carbon (carbon black, graphite, and charcoals), clays, and mineral powders (silica, bauxite, and zeolite), has considerably facilitated the handling of such composites and extended the number of applications thereby. Such composite adsorbents can be readily removed from the solution in which adsorption has taken place and other suspended matter does not interfere with this removal.

These prior art composite particles have been seriously limited in their application by the risk of interaction between the magnetic particles and the components of the system in which the composite particles are employed. In general these composites cannot be used in any system where there is the possibility of degradation or corrosion of the magnetic material or where, conversely, the magnetic material may attack or produce undesirable changes in the system being treated. In particular the prior art composites containing magnetic particles cannot be used in acid-containing media or in systems with a low pH.

For the same reason it has not been possible to prepare composite particles containing magnetic material where the manufacture of the polymer involves the use of any reagents that attack or degrade the magnetic material. For example, it has not been possible to usefully incorporate magnetic material into composites comprising cross-linked styrene-based resins prepared by such processes as chlormethylation and sulphonation with chlorosulphonic acid or oleum. While there are some acid-resistant magnetic materials available, for example the "Metglas" amorphous alloys ("Metglas" is a trademark of Allied Chemical Company, N.J.), none of these have the high magnetic permeability required for particles incorporated into composite adsorbents, filter aids, and ion-exchange resins.

We have now found a process of protecting magnetic particles against chemical attack both at low and high pH and this protection is retained while the magnetic particles are incorporated into the composite particles by chemical and physical treatments, and during the subsequent applications of the composite particles.

Accordingly we provide a process for preparing protected magnetic particulate matter which process comprises coating finely-divided magnetic material with chromium(III) hydroxide, oxyhydroxide or oxide. Preferably the coating is formed in a two-step procedure. In the first step a precipitate of chromium(III) hydroxide hydrogel is deposited on the surfaces of the magnetic particulate material, and in the second step the hydrogel is heated to form the coating.

Chromium(III) hydroxide can be precipitated from an aqueous solution of a chromium(III) salt such as chromium(III) nitrate, by the addition of a basic reagent such as an alkali metal carbonate or hydroxide, an ammonium solution, or an organic base. An aqueous solution of a basic reagent may be added directly to the solution of the chromium(III) salt. However, in order to effectively coat finely-divided magnetic particles with chromium(III) hydroxide in the form of a homogeneous hydrogel, we prefer to generate the basic reagent in the chromium(III) salt solution by the hydrolysis of a basic reagent precursor such as urea. The finely divided magnetic material is maintained in suspension in the solution by rapid stirring until precipitation of the hydrogel is complete. After the urea has been added the solution is heated and maintained at a temperature above 80° C., typically 90°–98° C. Complete precipitation is indicated by the change in colour of the solution.

The amount of base, and hence urea, required to convert the chromium(III) salt to the hydroxide can be calculated on a stoichiometric basis but we prefer to use an excess of urea over that theoretically required. A considerable excess of urea can be used to reduce the time for the precipitation. Other suitable basic reagent precursors may be selected from other compounds containing covalently-linked ammonia or substituted ammonia.

The weight/weight (w/w) ratio of coating to the magnetic material in the final product is controlled by adjusting the ratio of chromium(III) salt to the magnetic material in the precipitation step above. There must be sufficient coating to cover all the surface of the magnetic material. While moderate excess of coating beyond this amount is not harmful, such excess may unnecessarily reduce the proportion of the non-magnetic components of the composite particles, ie the ionexchange resin or adsorbents, and thus reduce the total capacity or utility of the composite particles.

Preferably the w/w ratio of coating to the magnetic material is in the range from 1:1 to 1:100 and most preferably the ratio is in the range of 1:10 to 1:50.

The second step wherein the hydrogel is heated to form the desired coating is a critical step in the process. After heating hydrogel coated magnetic particles at low temperatures, that is from about 100° to 240° C., the coating mainly comprises chromium(III) hydroxide. This coating is adequate where a moderate degree of protection for the magnetic material is required.

For high protection of the magnetic material the hydrogel is heated above 240° C. By high protection we mean resistance to attack of the magnetic material by corrosive agents for extended periods of time. In one preferred embodiment of our process we heat the chromium(III) hydroxide hydrogel at a temperature in the range of 240° to 360° C., preferably 270° to 330° C. After heating in this way the coating comprises mainly chromium oxyhydroxide (CrOOH). At these temperatures and higher, oxidation to higher valency states of chromium, for example chromium(VI), can occur unless oxygen is rigorously excluded by using vacuum or inert gas techniques. Formation of chromium(VI) can be reduced by using a stream of nitrogen or argon throughout the heating. Since even high purity nitrogen contains from 0.1–0.5% oxygen, such nitrogen is preferably purified, for example, by passage through acidified chromium(II) sulphate solution. The time of heating is in the range of 1 to 20 hours. Where formation of higher oxidation states of chromium cannot be completely avoided, the resultant products can be leached from the coating by subsequent washing with dilute inorganic acids.

Rigorous exclusion of oxygen vacuum or inert gas techniques may increase the process complexity and cost significantly. In a more preferred embodiment of the process of our invention we provide a process of calcining the hydrogel in an oxygen atmosphere, ensuring that chromium(VI) formation is minimized by permitting the chromium oxyhydroxide-chromium(III) oxide "glow phenomenon" to occur at a temperature above 360° C. In this embodiment temperature regulation is needed since many magnetic materials will not retain their magnetic properties if heated to excessively high temperatures. For example $\gamma$-ferric oxide (brown) is partially converted to the nonferromagnetic $\alpha$-ferric oxide (red) on heating to 450° C. and is rapidly converted above 500° C.

The preferred temperature range for this embodiment of our process is 380°–420° C.

In an even more preferred embodiment we provide a process of preparing magnetic particles coated with chromium(III) hydroxide, oxyhydroxide or oxide which is cross-linked with polyacrylic acid. These cross-linked coatings provide exceptionally high resistance to attack of the magnetic materials by external agents, and whereas the low-temperature formed chromium(III) hydroxide coating referred to hereinbefore does not give as high a degree of protection as the high-temperature formed oxyhydroxide or oxide, the polyacrylic acid cross-linked chromium(III) hydroxide coating is equally as effective as the polyacrylic acid cross-linked oxyhydroxide or oxide.

In one procedure linear polyacrylic acid, typically as a 25% w/w aqueous solution, is added to the suspension of hydrogel towards the end of the urea hydrolysis and the stirring and heating continued at a temperature in the range of 80°–100° C. for some hours. The solid is then collected and calcined, preferably at a temperature below 275° C. to avoid decomposition of the polyacrylic acid.

In a second more preferred procedure the chromium(III) oxide crosslinked polyacrylic acid coating is prepared by first calcining the hydrogel to chromium(III) oxide as hereinbefore described and then subsequently adding the polyacrylic acid solution and heating to effect crosslinking.

The crosslinked polyacrylic acid coatings provide enhanced protection of the magnetic materials and, furthermore, do not require an acid-leaching step to remove traces of chromium(VI).

The nature of the magnetic material that may be protected by the process of our invention is not narrowly critical. Typical magnetic materials are iron and alloys of iron and metals such as for example, cobalt, nickel, manganese, molybdenum, and aluminium, iron-silicon alloys, magnetic ceramics and ferrites. Suitable ferrites include the naturally occurring magnetite ($Fe_3O_4$), maghemite ($\gamma$-$Fe_2O_3$), jacobsite, franklinite, magnesioferrite, and magnetoplumbite.

Chromium dioxide may also be coated with chromium(III) hydroxide, oxyhydroxide, or oxide by the embodiments of the process of our invention described hereinbefore. Where it is desired to coat the chromium dioxide with a chromium(III) oxyhydroxide coating a further embodiment of the process of our invention may conveniently be used. In this further embodiment, the chromium in the chromium dioxide particulate matter may be used to prepare the coating thus removing the need for a chromium(III) salt.

The conversion of the external surfaces of the chromium dioxide particles to a coating of chromium(III) oxyhydroxide may be achieved in several ways. Hydrothermal treatment of chromium dioxide at temperatures of 200° C. and above, pressures of 50 atmospheres and above, will effectively form a coating of oxyhydroxide. This conversion may be more conveniently carried out at lower temperatures and pressures, for example at a pressure near one atmosphere, if the chromium dioxide particles are heated in doubly-distilled water.

In a preferred embodiment for coating chromium dioxide particles we provide a process of heating the said particles in an aqueous alkaline solution such as, for example, an aqueous sodium or potassium hydroxide solution. The concentration of sodium or potassium hydroxide in the alkaline solution is not narrowly critical. In this embodiment the chromium(IV) of the chromium dioxide on the external surfaces of the particles desproportionates into chromium(III) oxyhydroxide and chromate or dichromate. These chromate/dichromate ions are removed by filtration and washing of the treated chromium dioxide.

In yet another embodiment we provide a process of forming the chromium(III) oxyhydroxide coating on chromium dioxide by a reduction in the presence of hydrogen. When the coating of oxyhydroxide on chromium dioxide is prepared by any of the above methods, the coating may optionally be crosslinked with polyacrylic acid as described hereinbefore with reference to chromium(III) oxyhydroxide coatings prepared from the chromium(III) hydroxide hydrogel.

Magnetic ion-exchange resins ae typically beads of approximate diameter 200–300 $\mu$m, and the size of the protected magnetic particles for this application must be such as to allow adequate packing into such composites. The desired particles size range is 1–15 $\mu$m and in some cases it is desirable to mill the magnetic material to break up any lumps before coating by our process.

Magnetic composites for use as filter aids or adsorbents commonly have dimensions in the range of 5–100 $\mu$m, and preferably 10–50 $\mu$m. For these applications the magnetic particles usually have a largest dimension of less than 5 $\mu$m and preferably less than 1 $\mu$m. Small magnetic particles in a preferred size range of from 0.05 to 1.0 $\mu$m can also be satisfactorily coated by the process of our invention. Magnetic iron oxides such as maghemite and magnetite are often preferred for these applications since they are easily prepared as fine powders in contrast to other ferromagnetic materials such as alloys. Furthermore such oxides are less dense than alloys and are more readily dispersed in the polymerization medium used to prepare the magnetic composites.

The invention is now illustrated by, but not limited to, the following examples. The expression "about —°C." refers to temperatures near to, but not exceeding, the figures stated. All percentages are on a weight basis.

EXAMPLES 1–5

Preparation of hydrogel-coated $\gamma$-ferric oxide.

EXAMPLE 1

A sample (10 g) of γ-ferric oxide was homogenised in water and transferred to a round-bottom flask fitted with an overhead stirrer. Chromium nitrate ($Cr(NO_3)_3.9H_2O$; 25 g) and urea (25 g) were added and then sufficient water to give a total volume of 625 ml. The mixture was heated to 90° C. and stirred at this temperature for 20 hours at a stirring rate of 200 rpm. At this stage the pH of the solution had risen from 3 to 9 indicating that virtually all of the chromium was present in the hydrogel.

After cooling overnight the mixture was filtered and the recovered solid washed with water and acetone (3×20 ml). The solid was then slurried with diethyl ether (80 ml) and air dried. The ratio of coating (as $Cr(OH)_3$) to γ-ferric oxide was 1:1.5.

EXAMPLES 2-5

The procedure of Example 1 was repeated with variation in reaction conditions and quantities of reagents as indicated in Table 1.

TABLE 1

|  | Example | | | |
|---|---|---|---|---|
|  | 2 | 3 | 4 | 5 |
| Solution volume (ml) | 1900 | 400 | 400 | 400 |
| Stirring rate (rpm) | 500 | 250 | 250 | 250 |
| γ-Ferric oxide (g) | 30 | 15 | 15 | 20 |
| Chromium salt (g) | 80 | 10 | 10 | 5 |
| Urea (g) | 90 | 15 | 15 | 15 |
| Temperature (°C.) | 98 | 92 | 92 | 92 |
| Hydrolysis time (hr) | 4.5 | 5 | 3.5 | 5 |
| Ratio: $Cr(OH)_3$/γ-$Fe_2O_3$ | 1:1.5 | 1:5.5 | 1:5.5 | 1:15 |

EXAMPLES 6-8

Preparation of chromium(III) hydroxide coating.

EXAMPLE 6

The hydrogel-coated γ-ferric oxide of example 1 was heated in air in a crucible for 18 hours at a temperature of about 200° C. After cooling the product was added to a large excess of 1.0 M hydrochloric acid and kept at ambient temperatures with occasional agitation. The solution was analyzed for ferric ion content at intervals and the percentage loss of γ-$Fe_2O_3$ calculated. The results are shown in Table 2.

EXAMPLE 7

The procedure of Example 6 was repeated using a sample of hydrogel-coated γ-ferric oxide from Example 2 except that the crucible was heated in a stream of nitrogen at a temperature of about 120° C. for 15 hours. The results of a leaching test with 1.0 M hydrochloric acid is given in Table 2.

EXAMPLE 8

The procedure of Example 7 was repeated except that the temperature was 175° C. and the time of heating was 20 hours. The leaching results are given in Table 2.

EXAMPLES 9 AND 10

Preparation of chromium oxyhydroxide coating.

EXAMPLE 9

The procedure of Example 6 was repeated except that the temperature was maintained at 275° C. The leaching results are given in Table 2.

EXAMPLE 10

The procedure of Example 7 was repeated except that the temperature was about 240° C. and the time of heating 4 hours. The leaching results are given in Table 2.

EXAMPLE 11

Preparation of chromium(III) oxide coating.

A sample of the hydrogel-coated γ-ferric oxide of Example 2 was heated in a crucible in an oxygen stream for 22 hours with temperature cycling between 400° and 415° C. The leaching results are given in Table 2.

TABLE 2

| Coated γ-$Fe_2O_3$ from Example | % γ-$Fe_2O_3$ leached by 1.0 M HCl Days: | | | | | | |
|---|---|---|---|---|---|---|---|
|  | 1-2 | 4 | 9 | 19-23 | 28-32 | 39-44 | 70 |
| 6* | 0.08 | 0.11 | — | 0.19 | — | — | — |
| 7 | — | — | — | — | 4.7 | — | — |
| 8 | 0.3 | — | — | — | — | 4.5 | — |
| 9* | 0.08 | 0.10 | — | 0.14 | — | — | — |
| 10 | — | — | — | 3.1 | — | — | — |
| 11 | 0.34 | — | 0.54 | 0.65 | 0.69 | 0.87 | 1.1 |
| Untreated γ-$Fe_2O_3$ | 4.2 | 18 | — | 62 | — | — | — |

*Some leaching of the coating occurred during the test.

EXAMPLES 12 TO 14

Preparation of chromium(III) hydroxide coating crosslinked with polyacrylic acid.

EXAMPLE 12

A sample of hydrogel-coated γ-ferric oxide from Example 3 was heated in a stream of nitrogen at a temperature of about 160° C. for three hours. The product was cooled, collected and dispersed in water using an homogeniser for a short time. A sufficient volume of a 25% w/w aqueous solution of linear polyacrylic acid (Mol. Wt. between 50,000 and 150,000; viscosity 3,000 centipoise) was added so that the ratio of polyacrylic acid to coating was approximately 3:1 and the mixture heated at about 82° C. for 4 hours at pH 3. The polyacrylic acid crosslinked chromium(III) hydroxide coated γ-ferric oxide was collected using vacuum filtration and washed three times with water and three times with acetone. The product was left to dry in air. The acid leaching results are given in Table 3.

EXAMPLE 13

The procedure of Example 12 was repeated using hydrogel coated γ-ferric oxide of Example 5 and maintaining the pH at 9 throughout the heating with polyacrylic acid solution. The acid leaching results are given in Table 3.

EXAMPLE 14

The procedure of Example 4 was repeated up to the stage where the heating with urea was completed. A sample (24 g) of linear polyacrylic acid (as 25% aqueous solution) was added and the heating and stirring continued for 2 hours. After cooling the solid was recovered using vacuum filtration and washed with water and acetone. The product was then heated in vacuo at 160° C. for 3 hours. The acid leaching results are given in Table 3.

EXAMPLES 15 AND 16

Preparation of chromium oxyhydroxide coating crosslinked with polyacrylic acid.

EXAMPLE 15

The procedure of Example 12 was repeated except that the heating was carried out at a temperature of about 280° C. The acid leaching results for the product are given in Table 3.

EXAMPLE 16

The procedure of Example 15 was repeated except that the hydrogel coated γ-ferric oxide was prepared by the procedure of Example 5 and that the final product was heated in vacuo at 65° C. for 3 hours. The acid leaching results for the product are given in Table 3.

EXAMPLES 17 AND 18

Preparation of chromium(III) oxide coating crosslinked with polyacrylic acid.

EXAMPLE 17

The procedure of Example 12 was repeated except that the hydrogel coated γ-ferric oxide was heated in a stream of oxygen at a temperature of about 400° C. The acid leaching results are given in Table 3.

EXAMPLE 18

The procedure of Example 13 was repeated except that the hydrogel coated γ-ferric oxide was heated in a stream of oxygen at a temperature of about 400° C. The acid leaching results are given in Table 3.

TABLE 3

| Coated γ-Fe$_2$O$_3$ from Example | % γ-Fe$_2$O$_3$ leached by 1.0 M HCl Days: | | | | | |
|---|---|---|---|---|---|---|
| | 8 | 18 | 29 | 39 | 64 | 90 |
| 12 | 0.10 | 0.17 | 0.27 | 0.42 | 0.95 | — |
| 13 | 0.17 | 0.28 | — | — | — | — |
| 14 | 0.19 | 0.36 | 0.59 | 0.92 | 2.3 | 6.1 |
| 15 | 0.25 | 0.47 | 0.76 | 1.2 | 2.7 | — |
| 16 | 0.46 | 0.92 | — | — | — | — |
| 17 | 0.44 | 0.46 | 0.53 | 0.64 | 0.77 | 0.90 |
| 18 | 0.42 | 0.56 | 0.61 | 0.73 | 0.84 | 0.98 |

EXAMPLE 19

A sample of coated γ-ferric oxide prepared by the procedure of Example 17 was suspended in a 1 M aqueous sodium hydroxide solution at 20° C. The mixture was agitated occasionally and samples withdrawn and analyzed to determine the amount of chromium and iron leached by the solution. The analysis results are given in Table 4.

TABLE 4

| | Leaching by 1.0 M NaOH | | |
|---|---|---|---|
| Days of Treatment | 1 | 11–14 | 22 |
| % loss of chromium | <0.2 | 0.6 | 0.5 |
| % loss of γ-Fe$_2$O$_3$ | | 0.04 | 0.04 |

EXAMPLE 20

The product of Example 18 was dried at 100° C. in vacuo under P$_4$O$_{10}$ for 4 hours. Leaching results for Fe and Cr in various leachants are given in Table 5.

TABLE 5

| | % Fe$_2$O$_3$ leached | | | % Cr$_2$O$_3$ leached | | |
|---|---|---|---|---|---|---|
| | Day: | | | | | |
| Leachant | 3 | 14 | 40 | 3 | 14 | 40 |
| 1.0 M HCl | 0.21 | 0.43 | 0.66 | 0.24 | 0.51 | 0.88 |
| 1.0 M H$_2$SO$_4$ | 0.39 | 0.74 | 1.0 | 0.53 | 1.2 | 2.2 |
| 1.0 M NaOH | 0.02 | 0.02 | 0.02 | 1.0 | 1.4 | 1.7 |
| distilled water | 0.01 | 0.01 | 0.01 | 0.28 | 0.44 | 0.56 |
| 5 M NaOH | 0.04 | 0.03 | — | 0.94 | 1.2 | — |
| Conc. H$_2$SO$_4$ | 0.04 | 0.14 | — | 0.22 | 0.38 | — |

EXAMPLES 21 TO 23

Samples of chromium dioxide were refluxed in the solutions indicated in Table 6 for the periods shown. At the end of the reflux period the coated chromium dioxide was recovered by filtration, washed with water until the washings contained no chromate or dichromate ions, and air dried. The leaching tests on the dry coated particles are given in Table 6.

TABLE 6

| Example | CrO$_2$ refluxed in: | Time of Reflux (hr) | % CaO$_2$ leached by 1.0 M HCl Day: | | | |
|---|---|---|---|---|---|---|
| | | | 2 | 9 | 24 | 84 |
| 21 | 2 M, NaOH | 5 | 0.006 | 0.005 | 0.006 | 0.011 |
| 22 | Carbonate buffer, pH 9.6 | 6 | 0.027 | 0.037 | 0.043 | — |
| 23 | Doubly-distilled water | 7 | 0.11 | 0.14 | 0.20 | — |
| Untreated control | — | — | 0.3 | 0.5 | 1 | 4 |

I claim:

1. A process for preparing protected magnetic particulate matter which process comprises coating particles of magnetic material with at least one coating compound selected from the group consisting of chromium (III) hydroxide, chromium (III) oxyhydroxide and chromium (III) oxide by a first step of depositing chromium (III) hydroxide hydrogel on the said particles by the addition of a basic reagent to an aqueous solution of a chromium (III) salt containing the said particles wherein the said basic reagent is generated in situ by the hydrolysis of urea precursor, and a second step of heating the hydrogel-coated magnetic material to a temperature above 100° C.

2. A process according to claim 1 wherein the said particles are maintained in suspension by rapid stirring.

3. A process for preparing protected magnetic particulate matter which process comprises coating particles of magnetic material with at least one coating compound selected from the group consisting of chromium (III) hydroxide, chromium (III) oxyhydroxide and chromium (III) oxide by a first step of depositing chromium (III) hydroxide hydrogel on the said particles by the addition of a basic reagent to an aqueous solution of chromium (III) nitrate containing the said particles wherein the said basic reagent is generated in situ by the hydrolysis of a basic reagent precursor, and a second step of heating the hydrogel-coated magnetic material to a temperature above 100° C.

4. A process for preparing protected magnetic particulate matter which process comprises coating particles of magnetic material with at least one coating compound selected from the group consisting of chromium (III) oxyhydroxide and chromium (III) oxide by a first step of depositing chromium (III) hydroxide hydrogel on the said particles by the addition of a basic reagent to an aqueous solution of a chromium (III) salt containing the said particles wherein the said basic reagent is generated in situ by the hydrolysis of a basic reagent precursor, and a second step of heating the hydrogel-coated magnetic material to a temperature in the range 240° to 360° C.

5. A process for preparing protected magnetic particulate matter which process comprises coating particles of magnetic material with at least one coating compound selected from the group consisting of chromium (III) hydroxide, chromium (III) oxyhydroxide and chromium (III) oxide by a first step of depositing chromium (III) hydroxide hydrogel on the said particles by the addition of a basic reagent to an aqueous solution of a chromium (III) salt containing the said particles wherein the said basic reagent is generated in situ by the hydrolysis of a basic reagent precursor, and a second step of crosslinking the coating with polyacrylic acid and heating the hydrogel-coated magnetic material to a temperature in the range 100° to 275° C.

6. A process according to claim 1 wherein the chromium(III) salt is chromium(III) nitrate.

7. A process according to claim 1 wherein the said coating compound is chromium(III) hydroxide and the said temperature is in the range from 100° to 240° C.

8. A process according to claim 1 wherein the said coating compound comprises chromium(III) oxyhydroxide or chromium(III) oxide and the said temperature is in the range from 240° to 360° C.

9. A process according to claim 8 wherein the said temperature is in the range from 270° to 330° C.

10. A process according to any one of claims 9 and 10 wherein oxygen is excluded.

11. A process according to claim 1 wherein the said coating compound comprises chromium(III) oxyhydroxide or chromium(III) oxide and the said second step is carried out in the presence of oxygen at a temperature in the range of 380° to 420° C.

12. A process according to claim 1 wherein the said magnetic material is γ-ferric oxide.

13. A process according to claim 1 wherein the said magnetic material is chromium dioxide.

14. A process according to claim 1, wherein the chromium(III) hydroxide hydrogel coating on the magnetic material is crosslinked with polyacrylic acid and then heated to a temperature in the range of from 100° to 275° C.

15. A process according to claim 1 wherein the coating on the magnetic material is crosslinked with polyacrylic acid.

16. A process according to claim 14 or 15 wherein the polyacrylic acid is crosslinked to the coating by heating the coated magnetic material in aqueous polyacrylic acid to a temperature in the range of 80° to 100° C.

17. A process according to claim 1 wherein the said particles are in a size range from 0.05 to 5 μm.

18. A process according to claim 1 wherein the weight/weight ratio of coating to magnetic material is in the range of 1:1 to 1:100.

19. A process according to claim 18 wherein the said range is 1:100 to 1:50.

* * * * *